Figure 1:
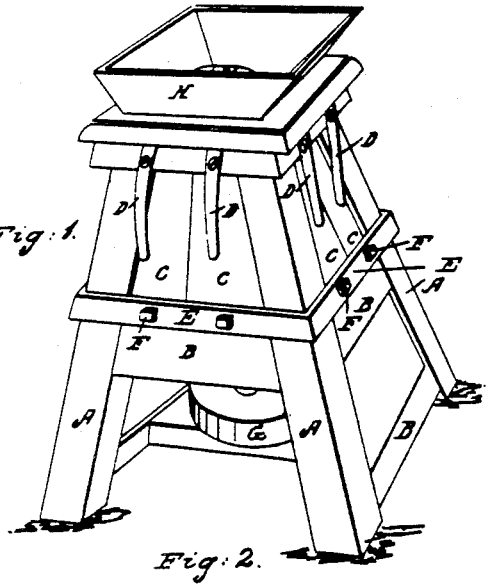
Figure 2:
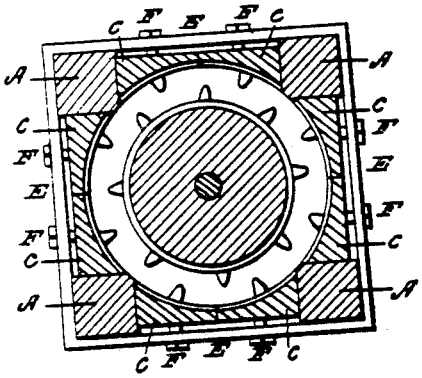

BEST AVAILABLE COPY

S. S. ALLEN.

Corn Sheller.

No. 40.

A. I. Patented March 29, 1841.

J. PETERS, Photo-Lithographer, Washington, D.C.